US008709905B2

(12) United States Patent
Crayfourd

(10) Patent No.: US 8,709,905 B2
(45) Date of Patent: Apr. 29, 2014

(54) COOKING OVEN WITH ENERGY SAVING MODE AND METHOD

(75) Inventor: David Crayfourd, Weybridge (GB)

(73) Assignee: Manitowoc Foodservice UK Limited (GB)

(*) Notice: Subject to any disclaimer, the term of this patent is extended or adjusted under 35 U.S.C. 154(b) by 201 days.

(21) Appl. No.: 12/872,349

(22) Filed: Aug. 31, 2010

(65) Prior Publication Data

US 2011/0049124 A1 Mar. 3, 2011

Related U.S. Application Data

(60) Provisional application No. 61/275,604, filed on Sep. 1, 2009.

(51) Int. Cl.
*A21B 1/40* (2006.01)

(52) U.S. Cl.
USPC .......................................... 438/391; 438/400

(58) Field of Classification Search
USPC ......................... 219/383, 385, 391, 399, 400
See application file for complete search history.

(56) References Cited

U.S. PATENT DOCUMENTS

| | | | | |
|---|---|---|---|---|
| 5,254,823 | A | 10/1993 | McKee et al. | 219/10.55 R |
| 6,660,982 | B2 | 12/2003 | Thorneywork | 219/702 |
| 6,903,318 | B2 | 6/2005 | Thorneywork | 219/702 |
| 2007/0278219 | A1 | 12/2007 | Claesson et al. | 219/702 |
| 2009/0075224 | A1 | 3/2009 | Wiker et al. | 432/8 |
| 2009/0089597 | A1 | 4/2009 | Sugita | 713/320 |

FOREIGN PATENT DOCUMENTS

WO WO 03/023615 A2 3/2003

OTHER PUBLICATIONS

International Preliminary Report on Patentability Mailed March 2, 2012 in the Corresponding PCT/US10/47389.

First Office Action issued by the State Intellectual Property Office (ISPO) of the People's Republic of China issued on Oct. 17, 2012 for Application No. 201090001278.6.

*Primary Examiner* — Savitr Mulpuri

(74) *Attorney, Agent, or Firm* — Ohlandt, Greeley, Ruggiero & Perle, L.L.P.

(57) ABSTRACT

An oven comprising a controller that operates the oven in a food cooking mode and in energy saving mode in which energy consumption of a heater and one or more fans is reduced. In the food cooking mode the controller maintains heated air flow at a first set temperature. In the energy saving mode the controller maintains the heated air flow at a second set temperature, which is less than the first set temperature, thereby reducing energy consumed by the heater. In the energy mode, controller also operates the fan that circulates the heater air and a cooling fan at reduced speeds, thereby reducing energy consumption of both fans.

7 Claims, 4 Drawing Sheets

COOKING OVEN WITH ENERGY SAVING MODE AND METHOD

RELATED APPLICATION

This application claims the benefit of U.S. Provisional Application, Ser. No. 61/275,604, filed on Sep. 1, 2009, the entire contents of which are incorporated herein.

FIELD OF THE DISCLOSURE

This invention relates to new and improved cooking ovens, systems, oven controllers and methods concerning an energy saving feature for cooking ovens in general.

BACKGROUND OF THE DISCLOSURE

A cooking oven that has both a microwave mode and an impingement mode is shown in U.S. Pat. No. 5,254,823 as an oven that has a rather large preheated thermal reservoir (at least 60 pounds) so as to facilitate rapid heat transfer to ambient air in a plenum. However, such an oven is quite heavy and cumbersome for many applications. Moreover, the preheat time is considerable (up to two or more hours) and cooling of the oven's exterior surfaces can be difficult and energy inefficient.

There is a need for an oven that conserves energy during non-cooking time.

SUMMARY OF THE DISCLOSURE

An oven for cooking food of the present disclosure comprises an oven chamber, a heater and a fan disposed to provide a heated airflow to the oven chamber, and a temperature sensor disposed to provide a temperature signal indicative of a temperature of the heated airflow. A controller uses the temperature signal to control operation of one or both of the fan and the heater to maintain the temperature of the heated airflow at a first set temperature during a cooking mode and at a second set temperature, which is less than the first set temperature, during an energy saving mode, thereby reducing energy consumed by the heater.

In another embodiment of the oven of the present disclosure, the controller enters the energy saving mode upon or after expiration of a predetermined time of non-cooking activity of the oven chamber.

In another embodiment of the oven of the present disclosure, the controller comprises a computer that comprises a processor, a memory and an energy saving program. The processor executes at least a first instruction of the energy saving program to maintain the temperature of the heated airflow at the second set temperature and to reduce a speed of the fan, thereby reducing energy consumption by the fan.

In another embodiment of the oven of the present disclosure, the processor executes at least a second instruction of the energy saving program to enter the energy saving mode upon or after expiration of a predetermined time of non-cooking activity of the oven chamber.

In another embodiment of the oven of the present disclosure, a cooling fan provides a cooling airflow in the oven. The processor executes at least a third instruction of the energy saving program to reduce a speed of the cooling fan to thereby reduce a speed of the cooling airflow and energy consumed by the cooling fan.

In another embodiment of the oven of the present disclosure, the oven further comprises a display that includes a back light. The processor executes at least a fourth instruction of the energy saving program to turn the back light off during the energy saving mode, thereby reducing energy consumed by the display.

In another embodiment of the oven of the present disclosure, the processor executes at least a fifth instruction of the energy saving program to turn the oven off at or after an expiration of a predetermined time of being in the energy saving mode.

In another embodiment of the oven of the present disclosure, the processor executes at least a sixth instruction of the energy saving program to end the energy saving mode upon a resumption of cooking activity in the oven chamber and to return to the cooking mode.

In another embodiment of the oven of the present disclosure, the memory is selected from the group, which consists of: on-board memory, $E^2$PROM, memory key, flash memory, memory disk and other external memory.

A method of the present disclosure operates an oven for cooking food that includes an oven chamber, a fan and a heater. The method comprises:

operating the fan and the heater to provide a heated airflow to the oven chamber;

controlling one or both of the fan and the heater to maintain the heated airflow at a first set temperature during a cooking mode; and controlling one or both of the fan and the heater to maintain the heated airflow at a second set temperature, which is less that the first set temperature, during an energy saving mode, thereby reducing energy consumed by the fan or the heater.

Another embodiment of the method of present disclosure further comprises entering the energy saving mode upon or after expiration of a predetermined time of non-cooking activity of the oven chamber during the cooking mode.

In another embodiment of the method of present disclosure, the oven further includes a display that includes a back light. The method further comprises turning the back light off during the energy saving mode, thereby reducing energy consumed by the display during the energy saving mode In another embodiment of the method of present disclosure, the oven further includes a cooling fan that provides cooling air to the oven. The method further comprises reducing the speed of the cooling fan during the energy saving mode, thereby reducing energy consumed by the cooling fan during the energy saving mode.

In another embodiment of the method of present disclosure, the speed of the cooling fan is reduced when the temperature of the heated airflow falls within a range of energy saving limits that encompasses the second set temperature.

In another embodiment of the method of present disclosure, the method further comprises ending the energy saving mode upon resumption of cooking activity of the oven chamber, and returning to the cooking mode.

In another embodiment of the method of present disclosure, the method further comprises turning the oven off at or after an expiration of a predetermined time of being in the energy saving mode.

A computer readable media of the present disclosure is for an oven that includes an oven chamber, a heater and a fan disposed to maintain a heated airflow in the oven chamber, and a controller that controls the fan and the heater to maintain a temperature of the heated airflow to at least a first set temperature during a cooking mode, and that comprises a processor and a memory, the computer readable media being readable by the processor, the computer readable media comprising:

an energy saving program; wherein the processor executes at least a first instruction of the energy saving program to maintain the temperature of the heated airflow at a second set temperature during an energy saving mode and to reduce a speed of the fan, thereby reducing energy consumed by the heater and the fan.

In another embodiment of the computer readable media of the present disclosure, the processor executes at least a second instruction of the energy saving program to enter the energy saving mode upon or after expiration of a predetermined time of non-cooking activity of the oven chamber.

In another embodiment of the computer readable media of the present disclosure, the oven further comprises a cooling fan that provides a cooling airflow in the oven. The processor executes at least a third instruction of the energy saving program to reduce a speed of the cooling fan to thereby reduce a speed of the cooling airflow and energy consumed by the cooling fan.

In another embodiment of the computer readable media of the present disclosure, the oven further comprises a display that includes a back light. The processor executes at least a fourth instruction of the energy saving program to turn the back light off during the energy saving mode, thereby reducing energy consumed by the display.

In another embodiment of the computer readable media of the present disclosure, the processor executes at least a fifth instruction of the energy saving program to turn the oven off at or after an expiration of a predetermined time of being in the energy saving mode.

In another embodiment of the computer readable media of the present disclosure, the processor executes at least a sixth instruction of the energy saving program to end the energy saving mode upon a resumption of cooking activity in the oven chamber and to return to the cooking mode.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

Ovens of various styles can be equipped with the energy saving feature described herein. Examples of ovens that can use the energy saving feature circulate air into an oven chamber via one or more holes from a top, bottom, side and/or back and out of the oven chamber to a fan via a suction port having one or more holes. Alternatively, the air can enter the oven chamber via a gap between a baffle plate and one or more of the oven chamber top, bottom, back or sides. The circulating air can be shaped into jets or columns of impingement air directed toward the food being cooked. By way of example and completeness of description, the energy saving feature is described herein in the oven shown in the figures.

Figure 1:
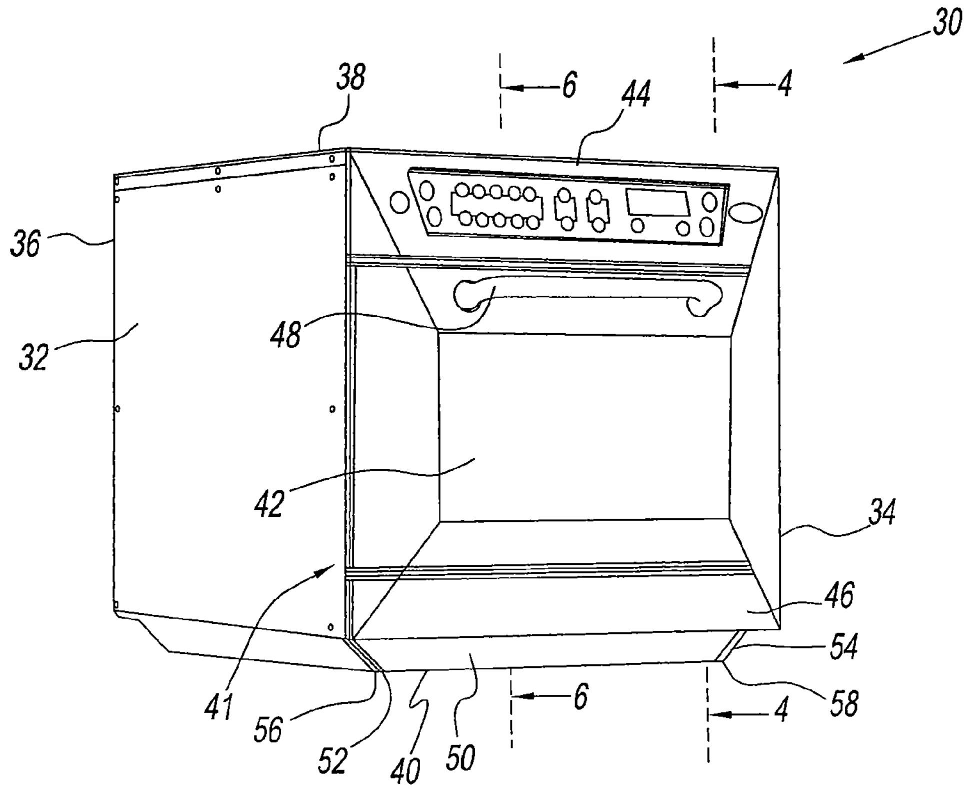
FIG. 1 is a perspective view of the oven of the present invention.
Figure 2:
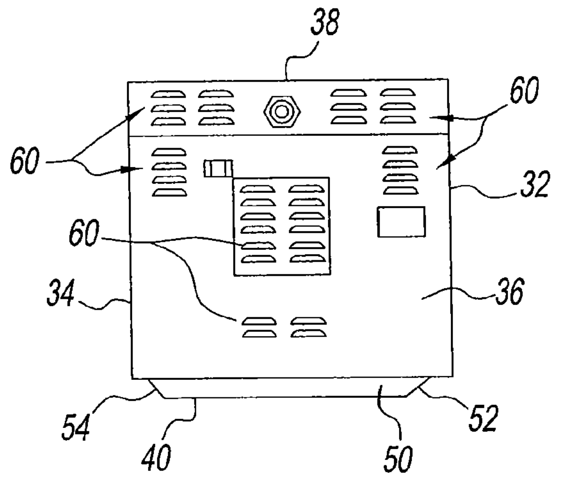
FIG. 2 is a rear view of the oven of FIG. 1.

Referring to FIGS. 1 and 2, an oven 30 of the present invention comprises a pair of outer side walls 32 and 34, an outer back wall 36, an outer top wall 38, an outer bottom wall 40 and a front wall 41, all of which comprise an outer enclosure. Front wall 41 comprises a door 42, a control panel 44 above door 42 and a grease drawer 46 below door 42. A handle 48 is disposed on door 42 for opening the door in a pull down manner.

Outer bottom wall 40 is offset from outer side walls 32 and 34, outer back wall 36 and front wall 41. The offset is preferably a bevel 50, but could have other shapes. An air intake port 52 and an air intake port 54 are located in opposed sides of bevel 50 adjacent outer side walls 32 and 34, respectively. Air filters 56 and 58 are disposed at air intake ports 52 and 54, respectively. Ambient air is taken in via air intake ports 52 and 54 to cool various control parts, a fan motor (not shown), outer side walls 32 and 34, outer bottom wall 40 and outer top wall 38 and outer back wall 36. The cooling air exits oven 30 via a plurality of louvers 60 disposed in outer back wall 36.

Figure 4:
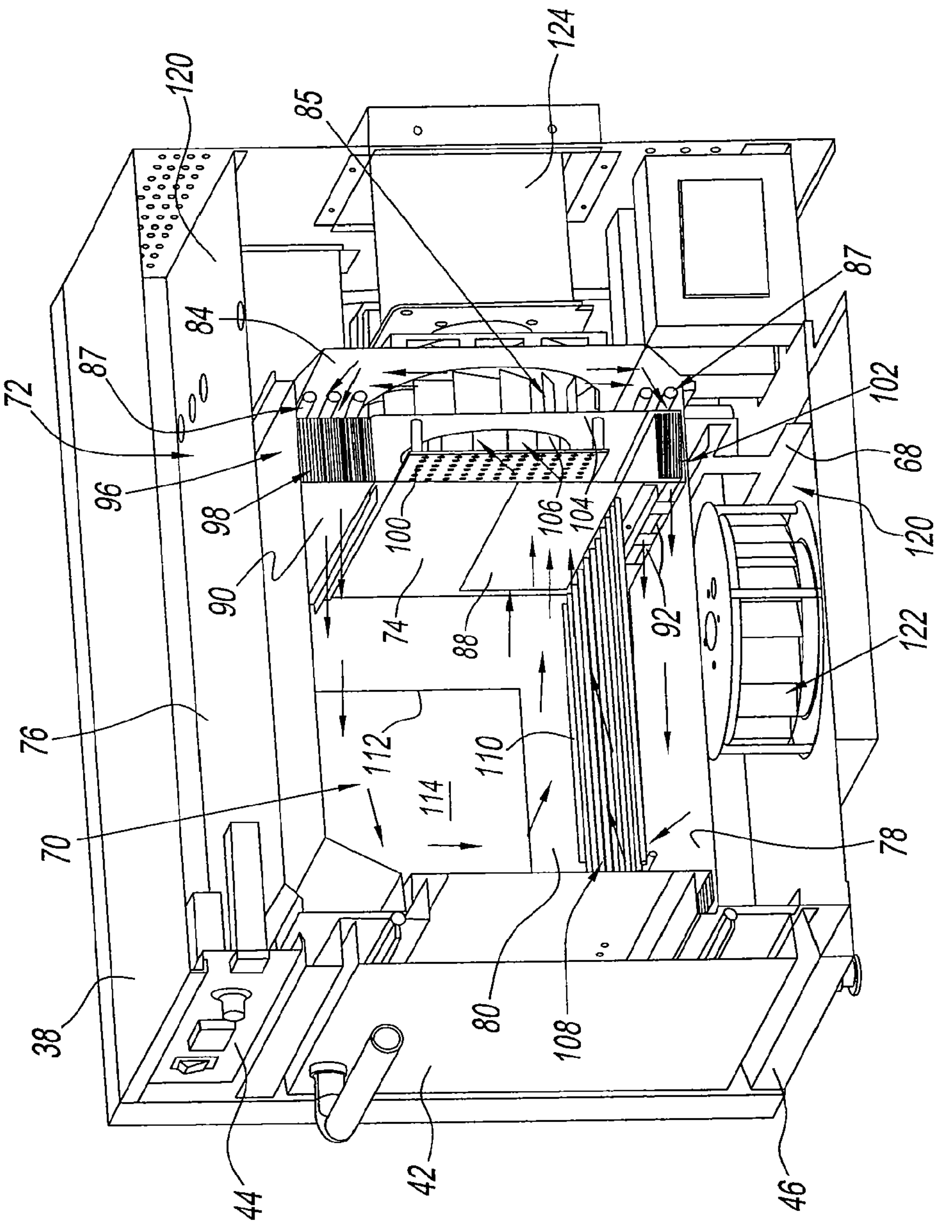
FIG. 4 is a cross-sectional view along line 4 of FIG. 1 that depicts the oven in a convection mode.

Referring to FIG. 4, oven 30 comprises an oven chamber 70 and a fan box 72 supported by a support structure 68, which is mechanically connected to outer bottom wall 40 and outer side walls 32 and 34. Oven chamber 70 and fan box 72 share an inner top wall 76, an inner bottom wall 78 and inner side walls 80 and 82, inner side wall 82 being shown only in FIGS. 6 and 7. Oven chamber 70 and fan box 72 also share a vertically disposed baffle plate 74. Thus, oven chamber 70 comprises door 42, baffle plate 74, inner top wall 76, inner bottom wall 78 an inner side wall 80 and an opposite inner side wall (not shown). Fan box 72 comprises baffle plate 74, inner top wall 76, inner bottom wall 78, inner side wall 80, the opposite inner side wall and an inner back wall 84. A fan 85 is disposed in fan box 72 and a heater 87 is disposed downstream of fan 85. Fan 85 may be any fan suitable for circulating heated air in an oven. Preferably, fan 85 is a three phase cage induction motor suitable for inverter drive, preferably L7FWDS-638 manufactured by Hanning. Heater 87 may be any heater (gas or electric) suitable for heating circulating air in a convection and/or impingement air oven. Preferably, heater 87 is an electrical heater having one or more heating elements disposed above and below the blades of fan 85.

Referring to FIG. 4, baffle plate 74 comprises a plurality of openings to provide a path for air to circulate between oven chamber 70 and fan box 72. An opening (not shown) is located above the bottom of baffle plate 74 at least partially in registration with fan 85 and is covered by a grease filter 88 mounted to baffle plate 74. An opening 90 is located at or near the top of baffle plate 74. One or more openings 92 are located near the bottom of baffle plate 74.

Grease filter 88 is advantageously located upstream airflow to the suction side of fan 85 to filter grease and/or other particles from the circulating air stream before reaching the blades of fan 85. Grease filter 88 is also located in a readily accessible position for removal and cleaning.

The oven chamber inner wall 80 and the opposite inner side wall are shaped so that grease and other liquid flows downwardly toward a grease drawer or pan 46. Since grease drawer 46 is readily removable, it is easy to clean.

A catalyst structure 96 is disposed in fan box 72 between fan 85 and baffle plate 74. Catalyst structure 96 comprises a catalyst 98, a catalyst 100 and a catalyst 102. Catalyst 98 is disposed adjacent inner top wall 76 in at least partial registration with opening 90 of baffle plate 74. Catalyst 100 is disposed at least in partial registration with grease filter 88 and fan 85. Catalyst 102 is disposed in registration with openings 92. A fan cover 104 has an opening 106 and is disposed between fan 85 and catalyst 100 so that opening 106 is in registration with fan 85 and catalyst 100.

Catalyst 100 may suitably be a sheet material with a plurality of apertures. For example, catalyst 100 may be 12×12 0.041 inch diameter open wire mesh available from Englehard. Catalysts 98 and 102 may suitably be 0.0006 inches metal foil hemingbone pattern substrate with platinum catalyst 105 cell per square inch available from Englehard.

Referring to FIG. 4, an oven rack 108 is disposed in oven chamber 70 on supports 110 mounted to inner side wall 80 and the opposite inner side wall so that oven rack 108 is near the bottom of grease filter 88 and above openings 92. Oven rack 108 may be a standard food rack, i.e., available off-shelf.

Outer walls 32, 34, 36, 38 and 40, which comprise an outer enclosure, inner walls 76, 78, 80, 82 and 84, which comprise an inner enclosure, and baffle plate 74 are preferably a metal, such as stainless steel.

Inner walls 76, 78, 80, 82, 84 and the opposite inner side wall are separated from outer walls 32, 34, 36, 38 and 40 by a passageway 120 for cooling air in combination oven 30. A cooling fan 122 is disposed in passageway 120 below oven chamber 70 and between outer bottom wall 40 and inner bottom wall 78. A fan motor compartment 124 is disposed in passageway 120 between outer back wall 36 and inner back wall 84. A fan motor (not shown) is disposed in fan motor compartment 124 and is coupled to rotate fan 85. A suitable thermal insulation (not shown) is disposed in passageway 120 about oven chamber 70 and fan box 72.

Figure 3:
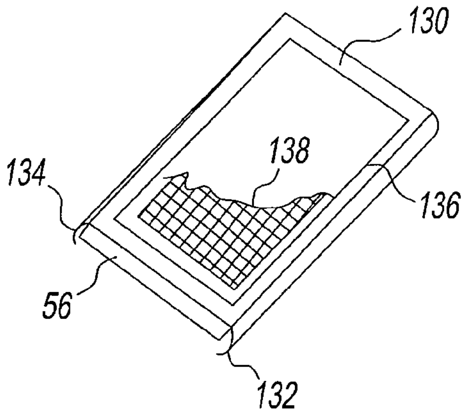
FIG. 3 is a perspective view of an air filter frame for the oven of FIG. 1.

Referring to FIGS. 1-3, there is shown an air filter holder 130 that permits easy installation and removal of air filter 56. To this end, air filter holder 130 comprises flanges 132 and 134 that are shaped for installation and removal of air filter 56 by a sliding motion. Air filter holder 130 also comprises an opening 136 that is in registration with air intake port 52. Air filter holder 130 is mounted to bevel 50 by any suitable fastener, such as screws. Alternatively, air filter holder 130 can be formed in bevel 50 by stamping or other metal working process. It will be apparent to those skilled in the art that a similar air filter holder 130 is provided for air filter 58. Air filters 56 and 58 each comprise an array of perforations. For example, the perforations may simply be the mesh of a screen, such as screen 138, a portion of which is shown for air filter 56.

Referring to FIGS. 1-4, cooling fan 122 is operable to circulate cooling air in passageway 120. The cooling air is drawn into passageway 120 from ambient via air intake ports 52 and 54 and flows through passageway 120 and exits via louvers 60 in outer back wall 36 to cool various control parts, the fan motor (not shown), outer side walls 32 and 34, outer bottom wall 40, outer top wall 38 and outer back wall 36. By locating air intake ports 52 and 54 in bevel 50, combination oven 30 can be located side by side with other structures (e.g., a wall), i.e., outer side walls 32 and 34 being flush against the other structures. This conserves space and allows combination oven 30 to have a smaller footprint than prior ovens.

Fan 85 circulates air drawn from oven chamber 70 into fan box 72 via grease filter 88 and catalyst 100. The air is heated by heater 87 and circulated to provide a heated air flow to oven chamber 70 via catalyst 98 and catalyst 102. Grease filter 88 and catalyst 100 function to remove contaminates (e.g., grease particles and other contaminates) from the air prior to contact with fan 85. Catalysts 98 and 102 function to further purify the heated air flow prior to circulation into oven chamber 70.

Figure 5:
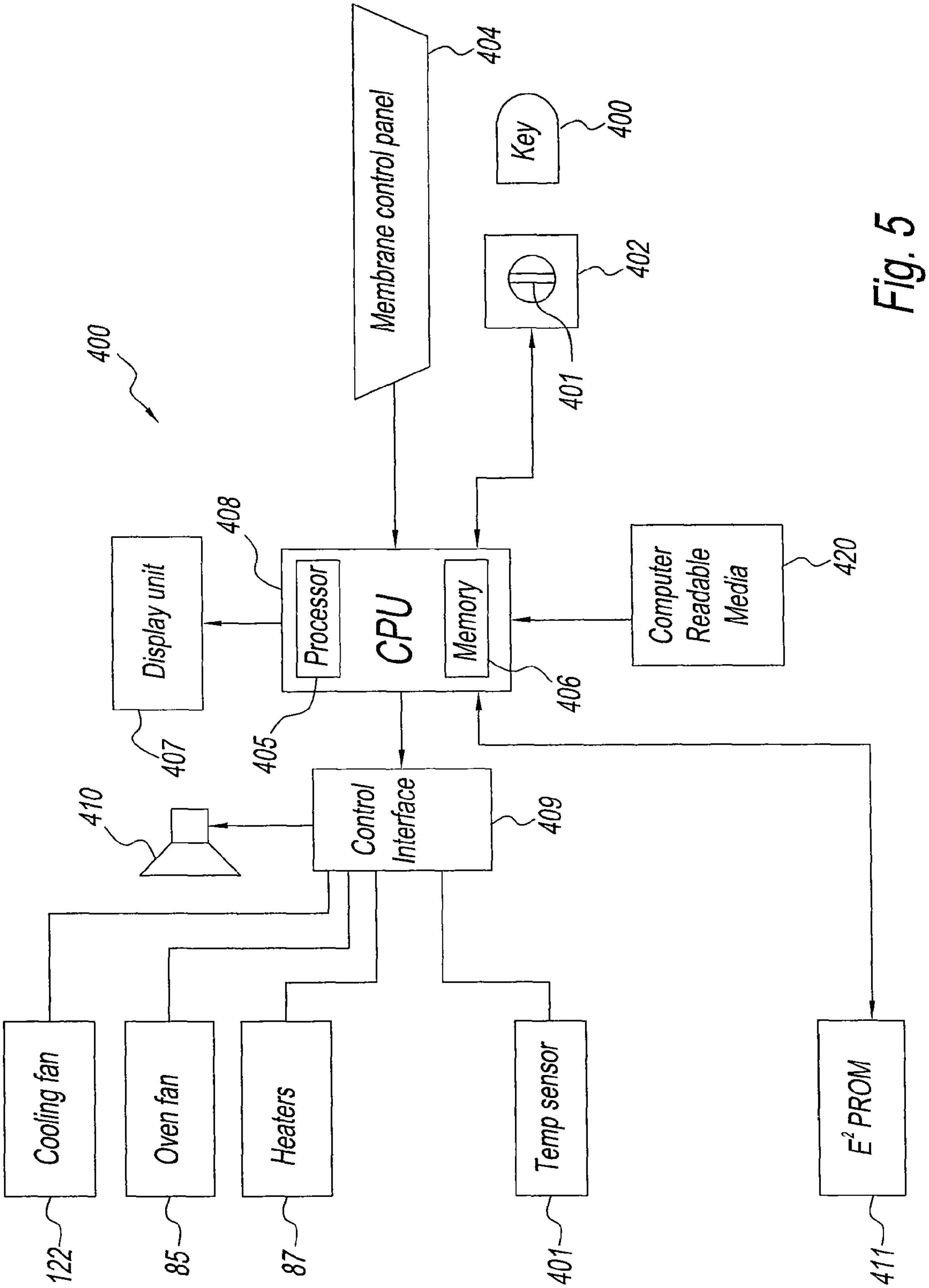
FIG. 5 is a block diagram of the controller of the oven of FIG. 1.

Referring to FIG. 5, a controller 400 is shown for oven 30. Controller 400 is similar to the controller shown in U.S. Pat. Nos. 6,660,982 and 6,903,318, which are hereby incorporated by reference. In particular, controller 400 includes a computer or central processing unit (CPU) 408 that is interconnected with a key reader 402, a manual control panel 404, a display unit 407, an audio alarm/beeper 410, a control interface 409, a memory 411 and oven 30. CPU 408 comprises a processor 405 and a memory 406.

Oven 30 comprises a temperature sensor 401 that is located in fan box 72, preferably downstream of heater 87 and upstream of catalyst 98 or catalyst 102 (FIG. 4). Temperature sensor 401 provides a signal that is proportional to the temperature of fan box 72. This signal is coupled via control interface 409 to CPU 408. Alternatively, temperature sensor 401 can be located in oven chamber 70.

Key reader 402 comprises a key aperture 401 adapted to receive a data key 400. Data key 400 is provided with program data corresponding to operation of oven 30. For example, data key 400 comprises a computer readable media upon which are stored cooking procedures and/or program code for operation of oven 30.

Key reader 402 comprises contacts that mate with contacts carried on key 400 that allow data to be passed to and from data key 400. For example, one or more programs for operating oven 30 may be stored on data key 400 for access by processor 406 via key reader 402. Optionally, processor 405 may store operating store in data key 400, which can be used for service, maintenance, analysis and the like.

Control interface 409 is interconnected with a number of devices of oven 30. To this end, control interface 409 is interconnected with cooling fan 122, fan 85, heaters 87, temperature sensor 401 and an ambient temperature sensor (not shown).

A memory 411 is connected with CPU 408 and may store one or more programs used by CPU 408 for control of oven 30. Optionally, memory 411 may be connected to control interface 409. In this case, CPU 408 accesses memory 411 via control interface 409. Memory 411, for example, may be an $EP^2ROM$.

A plurality of control programs is stored in memory 406, memory 411 and/or data key 400. These control programs include the energy saving feature of the present invention, WHICH IS SHOWN IN FIG. 6 as energy saving program 500.

Optionally, program data can be stored on any suitable computer readable media 420 and accessed by CPU 408 via a USB port (not shown). Computer readable media 420, for example, includes a data key (such as data key 400), a computer disk, a flash memory, a SIM card, or any other external computer readable memory media.

Figure 6:
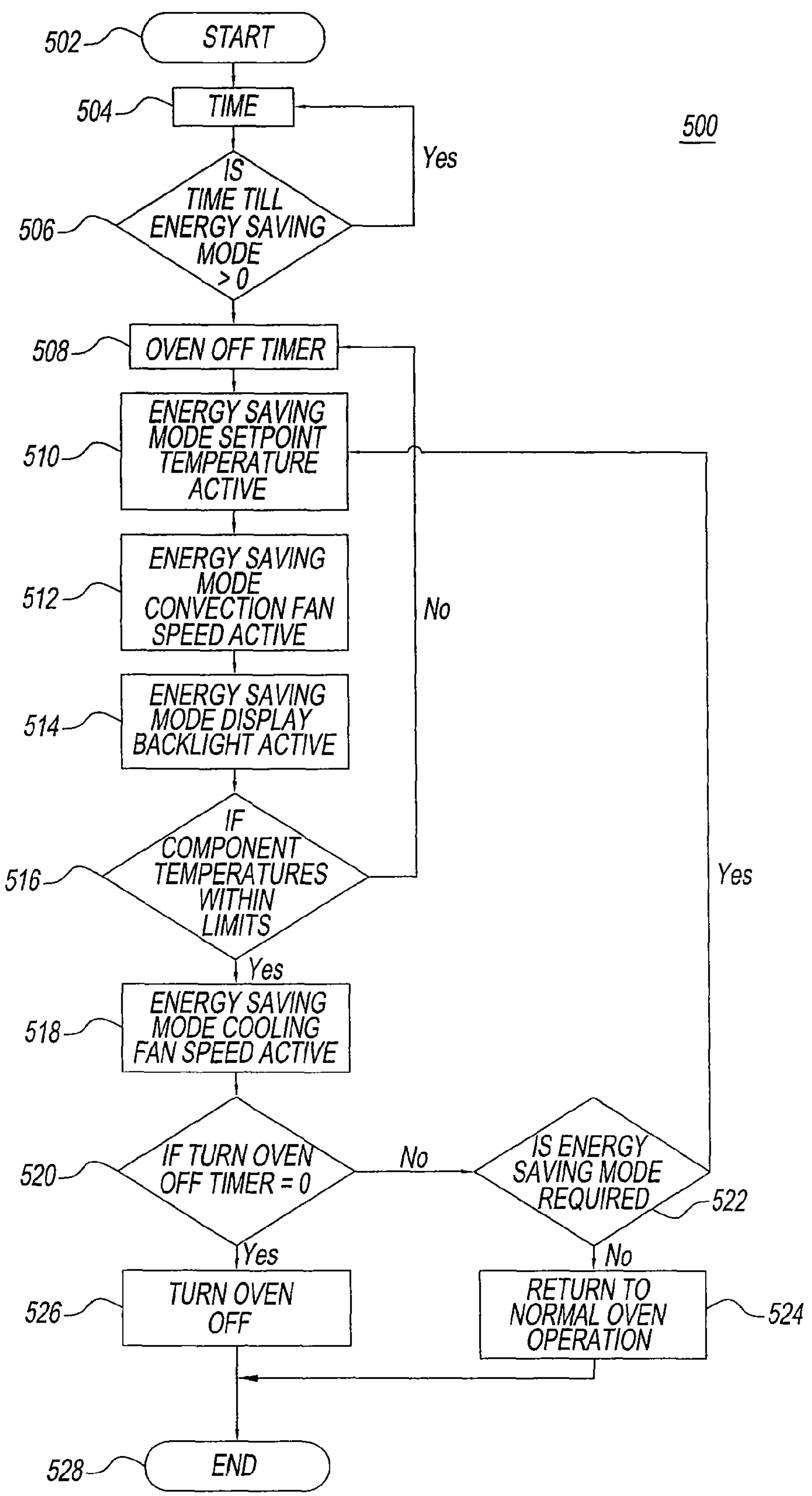
FIG. 6 is a flow diagram of the program energy saving program of the controller of FIG. 5.

Referring to FIG. 6, energy saving program 500 causes CPU 408 to control fan 85 and heater 87 during a non-cooking time of oven 30 to conserve energy, i.e., minimize energy consumption of oven 30. When oven 30 is operating within its normal parameters, controller 400 operates in a food cooking mode to maintain a temperature of the heated air flow to oven chamber 70 to at least one set point temperature. Controller 400 uses the temperature signal to control operation of heater 87 and fan 85 to maintain the temperature of the heated airflow at a first set temperature during a cooking mode. For example, from a cold start, controller 400 turns heater 87 and fan 85. When a current temperature of the heated airflow sensed by temperature sensor 401 attains the set point temperature (first set temperature) of the food cooking mode, controller 400 turns heater 87 off. When the current temperature falls a predetermined amount below the set point temperature, controller 400 turns heater 87 on. When the heated air flow again attains the set point temperature, controller 400 turns heater 87 off. This procedure reiterates during the food cooking mode.

If oven 30 is inactive (not cooking food, door open or other non-cooking activity), energy is in effect being wasted. Controller 400 minimizes these energy losses by entering an energy saving mode in which the heated air flow is brought to and maintained at a second set temperature, which is less than the first set temperature, thereby reducing energy consumed by heater 87.

In particular, CPU 408 runs an energy saving program 500. At box 502, CPU 408 begins execution of program 500. At box 504, a period of inactivity passes, e.g., 30 minutes while oven chamber 70 is initially heated up to the cooking mode set temperature. For example, an inactivity timer is set to a predetermined time indicative of the time of inactivity before entry into an Energy Saving Mode and begins a count down to zero. At box 506, CPU 408 compares the current time of the inactivity timer to zero. If greater than zero, control reverts to box 504 or waits until the current time equal zero. Alternatively, the inactivity counter could start from any known time and box 506 would monitor the current time for an elapsed time equal to the pre-defined inactivity time.

Should controller 400 begin controlling oven chamber 70 for an oven chamber operation (e.g., cooking, cleaning, maintenance, etc.) during the predefined inactivity period, the inactivity timer is reset. The inactivity timer is restarted when controller 400 again controls the temperature of oven chamber 70 to the set temperature. For example, this could occur when a cooking operation has ended.

When the current time of the inactivity timer is equal to or is less than zero, an oven off timer is initiated at box 508. That is, the oven off timer counts a pre-defined Energy Save Mode time period. At box 510, an energy saving set point temperature becomes active for use during the Energy Save Mode. The energy saving set point temperature is a suitable reduced temperature that allows for continued heating of the air flow, for example, 50° F. less than the normal set temperature of a cooking mode. For this example, the set temperature is reduced by about 50° F. from the food cooking mode set temperature. This causes CPU 408 to control heater 87 based on the temperature sensed by temperature sensor 401 to reduce the temperature of the heated air flow by about 50° F. For example, heater 87 is turned off at this point and remains off until the fan box temperature attains the reduced fan box temperature. At this point controller 400 controls heater 87 to maintain the reduced fan box temperature.

At box 512, CPU 406 reduces the speed of fan 85 to an energy saving speed, but continues to circulate the heated air at the reduced speed. That is, a reduced volume of air per unit time is being circulated. Importantly, fan 85 consumes less energy, thereby reducing energy consumption by fan 85.

At box 514, a display back light of display unit 407 is dimmed to reduce consumption of electrical energy during the Energy Save Mode. At box 516 CPU 406 determines if the current temperature sensed by temperature sensor 401 is within the Energy Save Mode limits. If not, CPU repeats execution of boxes 510, 512, 514 and 516. If the current sensed temperature is within the limits, at box 516 reduces the speed of cooling fan 122 to an Energy Save Mode speed, thereby reducing energy consumption of cooling fan 122.

At box 520, CPU 406 determines if the oven off timer equals zero. If not, at box 522 CPU 406 determines if the Energy Save Mode is required. If not, at box 524 CPU 406 returns controller to normal operation for a cooking mode (i.e., reverts to the normal running parameters and continues operation) and exits program 500 at box 528. For example, the Energy Save mode is not required if the operator has placed food in the oven and operated panel 404 to cause oven 30 to cook the food.

If at box 522 it is determined that the Energy Save Mode is required, processor 405 repeats execution of boxes 510, 512, 514, 516, 518, 520 and 522. At box 520, if the oven off timer equals zero, CPU 406 turns oven 30 off. That is, the count of the oven off timer has reached the end of the pre-defined Energy Save Mode time period. Should oven 30 still be inactive at the end of this period, CPU 406 turns oven 30 off.

The oven of the present invention has several advantages: Controller 400 reduces convection air speed to reduce heat losses from oven chamber 70, thereby reducing energy consumption. Controller 400 during the Energy Save Mode continues to heat the air so as to enable oven chamber 70 to regain temperature quickly upon restart. Controller 400 reduces the speed of cooling fan 122 to further reduce energy consumption. Controller 400 reduces electrical current to the display back light to further reduce electrical energy usage.

The present invention having been thus described with particular reference to the preferred forms thereof, it will be obvious that various changes and modifications may be made therein without departing from the spirit and scope of the present invention as defined in the appended claims.

What is claimed is:

1. An oven for cooking food comprising:

an oven chamber, a heater and a fan disposed to provide a heated airflow to said oven chamber;

a temperature sensor disposed to provide a temperature signal indicative of a temperature of said heated airflow; and a controller that uses said temperature signal to control operation of one or both of said fan and said heater to maintain said temperature of said heated airflow at a first set temperature during a cooking mode and at a second set temperature, which is less than said first set temperature, during an energy saving mode of non-cooking activity of said oven, thereby reducing energy consumed by said heater, wherein said controller comprises a computer that comprises a processor, a memory and an energy saving program, wherein said processor executes at least a first instruction of said energy saving program to maintain said temperature of said heated airflow at said second set temperature and to reduce a speed of said fan, thereby reducing energy consumption by said fan, and wherein said processor executes at least additional instruction of said energy saving program to turn said oven off at or after an expiration of a predetermined time of being in said energy saving mode.

2. The oven of claim 1, wherein said controller enters said energy saving mode upon or after expiration of a predetermined time of non-cooking activity of said oven during said cooking mode.

3. The oven of claim 1, wherein said processor executes at least a second instruction of said energy saving program to enter said energy saving mode upon or after expiration of a predetermined time of non-cooking activity of during said cooking mode.

4. The oven of claim 1, further comprising a cooling fan that provides a cooling airflow in said oven, wherein said processor executes at least a third instruction of said energy saving program to reduce a speed of said cooling fan during said energy saving mode to thereby reduce a speed of said cooling airflow and energy consumed by said cooling fan during said energy saving mode.

5. The oven of claim 1, further comprising a display that includes a back light, and wherein said processor executes at least a fourth instruction of said energy saving program to turn said back light off during said energy saving mode, thereby reducing energy consumed by said display.

6. The oven of claim 1, wherein said processor executes at least a sixth instruction of said energy saving program to end said energy saving mode upon a resumption of cooking activity in said oven chamber and to return to said cooking mode.

7. The oven of claim 1, wherein said memory is selected from the group, which consists of: on-board memory, $E^2PROM$, memory key, flash memory, memory disk and other external memory.

* * * * *